S. E. HANSEN.
BEARING BOARD.
APPLICATION FILED DEC. 3, 1919.

1,393,891.

Patented Oct. 18, 1921.

Inventor.
Sofus E. Hansen.

by Fred P. Gorin his Atty.

UNITED STATES PATENT OFFICE.

SOFUS E. HANSEN, OF SEATTLE, WASHINGTON.

BEARING-BOARD.

1,393,891.　　　　Specification of Letters Patent.　　Patented Oct. 18, 1921.

Application filed December 3, 1919.　Serial No. 342,105.

*To all whom it may concern:*

Be it known that SOFUS E. HANSEN, a citizen of the United States, residing at Seattle, in the county of King and State of Washington, has invented certain new and useful Improvements in Bearing-Boards, of which the following is a specification.

The invention relates to bearing boards.

The object of the invention is to provide a rectangular board having a scale and an indicator mounted thereon to coöperate with the scale, to indicate angles of objects sighted over sight vanes on the indicator with the edge of the board.

The invention also comprehends improvements in the details of construction and operation which will be hereinafter described and pointed out in the claim.

Figure 1:
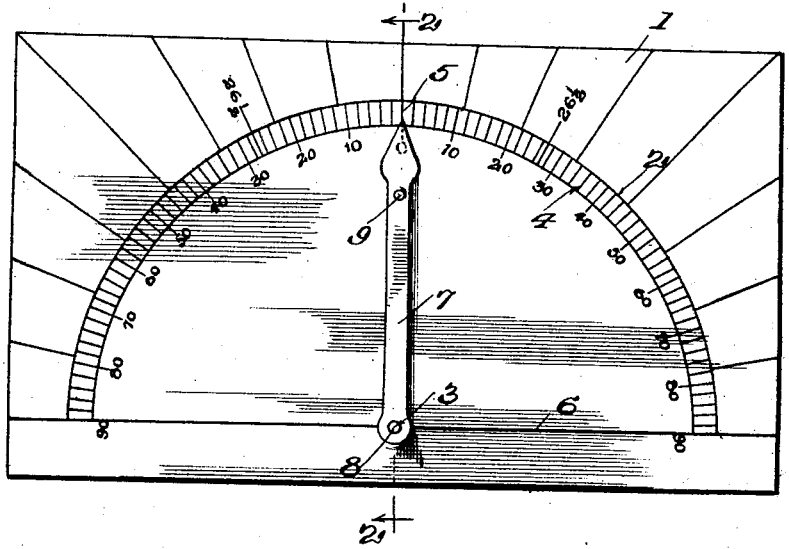
Figure 1 is a plan view.
Figure 2:
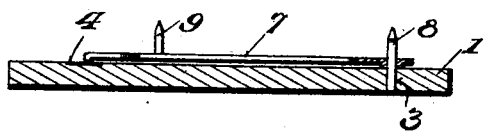
Fig. 2 is a transverse section on the line 2—2 of Fig. 1.

1 indicates a rectangular board having a semi-circle 2, with the center at 3 and having a scale 4, around the inner edge of the semi-circle 2, on either side of the transverse center line 5, to indicate degrees. The center line 5 forms the zero point of the scale and the ends of the semi-circle 2 are joined by the diameter line 6.

Scale divisions 4$^a$ are formed on the board, and indicate major angles commonly used by navigators in taking bearings of objects when navigating near the coast for determining the ship's position.

A pointer 7, is pivoted at the center 3, of the semi-circle and has a rear sight-vane 8, mounted thereon on the center 3. A forward sight-vane 9, is mounted on the pointer 7 near the pointed end thereof. The end of the pointer has an offset portion 10, which rides over the scale and provides a bearing surface therefor so that the pointer may be easily turned on its pivot but is held in any position set by the friction of the offset end with the board.

This device is made especially for use aboard ship in taking bearings of distant objects. To get the bearing of a distant object the board is placed with one of its edges against some part of the ship the edge of which is parallel with the fore and aft line thereof. Then the distant object, the angle of which with the ship is desired, is sighted on the vanes 8 and 9 so that they are in a line with the object and the angle with the fore and aft line of the ship may then be read on the scale 4.

It is obvious that the device may be used for other purposes where similar results are desired.

What I claim is:

A bearing board comprising a rectangular board having a semi-circle thereon and a straight line connecting the ends of said semi-circle, said straight line and semi-circle being spaced from the edges of the board, the board having a scale formed thereon around the inside of the semi-circle and a second scale being formed on the board around the outside of the semi-circle, a pointer pivotally mounted at the center of said semi-circle, a rear sight vane mounted at the center of the semi-circle and a forward sight-vane mounted on the pointer.

In testimony whereof I affix my signature.

SOFUS E. HANSEN.